United States Patent
Rawinski

(10) Patent No.: US 9,770,774 B2
(45) Date of Patent: Sep. 26, 2017

(54) METHOD AND CLEANING SYSTEM FOR CLEANING THE PROCESS GAS IN SOLDERING INSTALLATIONS

(71) Applicant: ERSA GmbH, Wertheim (DE)

(72) Inventor: Viktoria Rawinski, Marktheidenfeld (DE)

(73) Assignee: ERSA GmbH, Wertheim (DE)

( * ) Notice: Subject to any disclaimer, the term of this patent is extended or adjusted under 35 U.S.C. 154(b) by 598 days.

(21) Appl. No.: 14/067,899

(22) Filed: Oct. 30, 2013

(65) Prior Publication Data
US 2014/0127108 A1     May 8, 2014

(30) Foreign Application Priority Data
Nov. 6, 2012 (DE) ........................ 10 2012 220 159

(51) Int. Cl.
| | |
|---|---|
| *B01D 53/02* | (2006.01) |
| *B23K 3/08* | (2006.01) |
| *B01D 53/72* | (2006.01) |
| *B01D 53/82* | (2006.01) |

(52) U.S. Cl.
CPC ................ *B23K 3/08* (2013.01); *B01D 53/72* (2013.01); *B01D 53/82* (2013.01); *B01D 2251/306* (2013.01); *B01D 2251/404* (2013.01); *B01D 2251/70* (2013.01); *B01D 2257/70* (2013.01)

(58) Field of Classification Search
None
See application file for complete search history.

(56) References Cited

U.S. PATENT DOCUMENTS

| | | | | |
|---|---|---|---|---|
| 4,092,182 A | * | 5/1978 | Arbib | ................ B23K 35/3612 |
| | | | | 148/23 |
| 5,364,007 A | * | 11/1994 | Jacobs | ................ B23K 3/0646 |
| | | | | 219/390 |
| 5,495,511 A | * | 2/1996 | Chakraborty | ............ G21C 9/06 |
| | | | | 376/279 |
| 6,146,451 A | | 11/2000 | Sakata et al. | |

(Continued)

FOREIGN PATENT DOCUMENTS

| | | | | |
|---|---|---|---|---|
| CN | 1576746 | | 2/2005 | |
| DE | 3725290 A1 | * | 2/1989 | ............. B01J 23/89 |

(Continued)

OTHER PUBLICATIONS

DE 3725290 A1 English Translation (1989).*

(Continued)

*Primary Examiner* — Anita Nassiri Motlagh
(74) *Attorney, Agent, or Firm* — MDIP LLC

(57) ABSTRACT

The invention relates to a method for cleaning the process gas in soldering installations and solder suction systems, in particular for reducing the abietic acid in the process gas, wherein the process gas to be cleaned is conducted through a cleaning system which contains one or more of the following compounds (cleaning compounds):
  a) carboxylic acids with reducing properties, namely oxalic acid, formic acid, citric acid and/or ascorbic acid;
  b) metal compounds of higher oxidation states, namely manganates, permanganates, chromates and/or dichromates;
  c) alcohols which can be convened into the carboxylic acids mentioned in a) by means of oxidation;
  d) basic lime compounds.

15 Claims, 1 Drawing Sheet

(56) References Cited

U.S. PATENT DOCUMENTS

| | | |
|---|---|---|
| 6,645,447 B2 | 11/2003 | Rohrbach et al. |
| 9,108,142 B2 | 8/2015 | England |
| 2006/0042209 A1 | 3/2006 | Dallas et al. |
| 2008/0236389 A1 | 10/2008 | Leedy et al. |
| 2008/0276801 A1 | 11/2008 | Bell et al. |
| 2009/0324454 A1 | 12/2009 | Nakano et al. |
| 2011/0316186 A1 | 12/2011 | England |

FOREIGN PATENT DOCUMENTS

| | | |
|---|---|---|
| JP | 11076722 | 3/1999 |
| JP | 2012121046 | 6/2012 |

OTHER PUBLICATIONS

Corresponding CN application search report.
Bai, "Indoor . . . prevention," 1st ed., Apr. 2006, Chem Ind Press, pp. 141-142.

\* cited by examiner

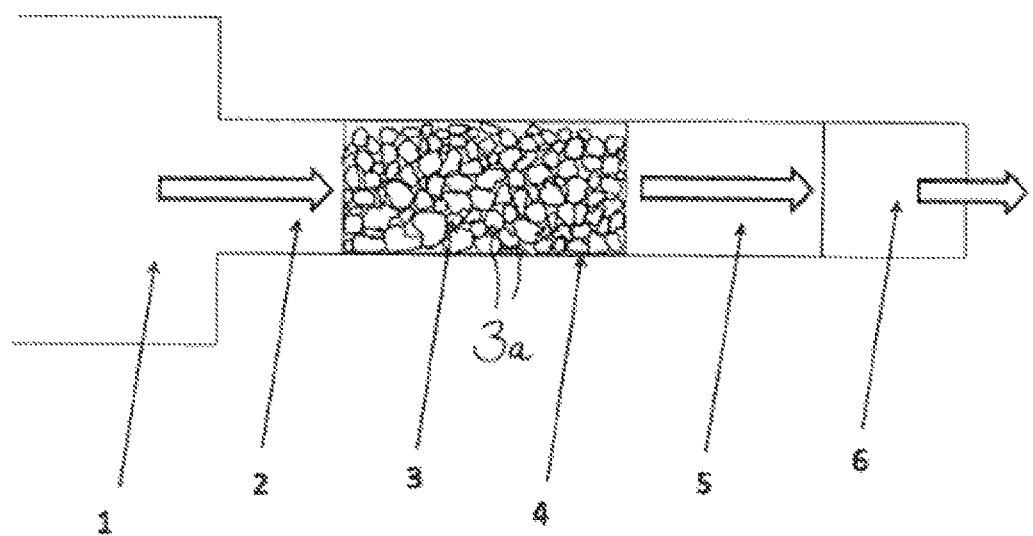

METHOD AND CLEANING SYSTEM FOR CLEANING THE PROCESS GAS IN SOLDERING INSTALLATIONS

CROSS REFERENCE TO RELATED APPLICATION

This application claims benefit to German Patent and Trademark Office Application No, 10 2012 220 159.9, filed Nov. 6, 2012, which is incorporated by reference herein in its entirety.

BACKGROUND OF THE INVENTION

Field of the Invention

The present invention relates to a method and to cleaning system for cleaning the process gas in soldering installations and solder suction systems.

Background Information

For soldering in soldering installations, such as reflow soldering installations, usually fluxes are used which enable the metallic solder and the parts to be soldered to form a solid metallic connection. During heating, the flux reduces the surfaces of the faces to be joined and of the solder and, at the same time, prevents a renewed formation of oxides by forming a liquid protective layer. Another effect is the reduction of the surface tension of the liquid solder. Fluxes vary with regard to their composition, wherein the same depends on the type of the parts to be soldered. For electronics, often the organic substance colophony is used, which does not leave any corrosive residues during soldering and has a reducing effect during heating.

Depositions in the soldering installation are one problem which occurs with soldering installations. A large part of these condensed depositions, which develop during the soldering process, results from the high-molecular compounds which are present in the flux (e.g. colophony) Another part of the soldering fumes includes, to a large extent, gaseous components of the printed circuit board substrate and of the solder resist. When using colophony as a flux, the abietic acid included, in the colophony often constitutes a good part of the above-mentioned depositions.

With the soldering installations from the state of the art, usually, in the soldering process, a combination of a filter and a heat exchanger is used for cleaning the process gas, wherein, with some soldering installations, only process gas filters or only heat exchangers are used. By means of the process gas filter, high-molecular compounds are partly filtered out of the process gas physically. As a filter material, typically materials with a very large specific surface, such as polyester fleece, granulate or the like, are used here. The process gas that has been pre-cleaned in this way can subsequently be conducted past a number of heat exchangers, such that the low-molecular condensate components can condense at the cooler surface of the heat exchangers. With some soldering installations, the process gas is conducted past a heating source over a defined course and is heated to a temperature of more than 500° C. In the course of this, high-molecular condensate compounds are partly cracked and new low-molecular compounds develop, which can be filtered more effectively.

The problem with the soldering installations and solder suction systems known from the state of the art consists in the fact that the above-mentioned, methods for cleaning the process gas are insufficient and that undesired depositions of high-molecular compounds in the soldering installation occur again and again. With 80 percent of all soldering installations, the condensed depositions result from the colophony used in the flux. With other fluxes, these problems are also caused by high-molecular compounds.

SUMMARY OF THE INVENTION

The present invention is based on the object to avoid the disadvantages with the known soldering installations with respect to the depositions outlined above, in particular, the challenge consists in extracting the above-mentioned high-molecular compounds from the process gas before they are able to condense at the walls of the soldering installation.

This object is attained, in the first place, by means of a method for cleaning the process gas in soldering installations and solder suction systems having the features of claim 1.

Generally, the method serves to reduce high-molecular substances from the fluxes used during soldering. The method according to the invention in particular serves to reduce the abietic acid in the process gas, which is in turn included in the colophony. With the method according to the invention, the process gas to be cleaned is conducted through a cleaning system which contains one or more of the following compounds:

a) carboxylic acids with reducing properties, namely oxalic acid, formic acid, citric acid and/or ascorbic acid:

b) metal compounds of higher oxidation states, namely manganates, permanganates, chromates and/or dichromates;

c) alcohols which can be converted into the carboxylic acids mentioned in a) by means of oxidation, d) basic lime compounds.

Here, the principle of the cleaning technique is based on a chemical reaction of the volatile flux elements which exist in the process gas and of other high-molecular process gas components. Surprisingly, the inventors have found out that the above-mentioned compounds are able to modify (e.g., split) said flux elements and said high-molecular process gas components, resulting in the mentioned elements and high-molecular compounds not or hardly anymore being able to form depositions in the soldering installations. Here, the contaminated process gas is usually suctioned off and is introduced into the cleaning system by means of a conductor. Then, the gaseous flux compounds included in the process gas and other high-molecular process gas components reach the cleaning system. When flowing through the cleaning system, the above-mentioned gaseous condensate compounds having, high molecular weights react with the above-mentioned cleaning compounds, and low-molecular compounds having: lower molecular weights develop. Now, the gaseous condensate compounds that are formed in this way are smaller, lighter and less voluminous from a spatial point of view. The condensation temperature of the process gas has significantly been decreased by means of this process. Due to the reduced condensation temperature, the remaining components can be collected in a cleaning chamber in a targeted manner and do not condense in the working area of the soldering installation. In a preferably successive positioning of filter and/or heat exchanger, the volatile components of the process gas can be prompted to condense. Subsequently, the cleaned gas can be reintroduced into the process, for instance.

With a preferred method variant, the cleaning system contains oxalic acid or permanganate, in particular potassium permanganate or calcium hydroxide. The mentioned substances have proven to be particularly effective when cleaning the process gas in soldering installations and solder suction systems.

For instance, it has turned out that oxalic acid is able to split the abietic acid included in the colophony into smaller molecules, which possess a substantially lower condensation temperature and which are still freely movable at the temperatures prevailing in the process zones. Above all, the oxalic acid splits the methyl groups which are present in the abietic acid off from this molecule.

Potassium permanganate, in turn, reacts with colophony due to the fact that the organic compounds included in the colophony are destroyed, such that non-sticky smaller inorganic particles are created.

Calcium hydroxide, in turn, causes a neutralization of the abietic acid, wherein the properties of the condensate are changed. In the annex to this application, preliminary tests with the mentioned, substances are described.

The cleaning system can be free of filter material and can contain only one or more of the cleaning compounds. With a preferred method variant, the cleaning system, however, contains filter material, in particular aluminum oxide (e.g. $Al_2O_3$), silica gel, diatomaceous earth, zeolites, cellulose, glass wool and/or metal braiding, which filter material is mixed and/or coated and/or impregnated with one or more of the cleaning compounds. By using filter material which is mixed and/of coated and/or impregnated, with the cleaning compounds, on the one hand, the reaction surface can be increased and, on the other hand, it is possible to work with smaller amounts of cleaning compounds.

Cleaning of the process gas can take place both inside and outside of the process zone. Preferably, cleaning of the process gas takes place inside of the process zone.

Advantageously, cleaning of the process was takes place at a maximum temperature of 350° C. Higher temperatures are not required due to the chemical cleaning which takes place with the method according to the invention, such that it is possible to save energy.

Furthermore, the present invention relates to a use of at least one compound selected from the group consisting of a) carboxylic acids with reducing properties, namely oxalic acid, formic acid, citric acid and/or ascorbic acid;

b) metal compounds of higher oxidation states, namely manganates, permanganates, chromates and/or dichromates;

c) alcohols which can be converted into the carboxylic acids mentioned in a) by means of oxidation;

d) basic lime compounds, for cleaning the process gas in soldering installations and solder suction systems, in particular for reducing the abietic acid in the process gas.

Preferably, the at least one compound is selected from the group consisting of oxalic acid, permanganate, in particular potassium permanganate and calcium hydroxide (advantages see above).

Advantageously, the at least one compound is mixed with and/or applied onto and/or incorporated into filter immaterial, in particular aluminum oxide (e.g. $Al_2O_3$), silica gel, diatomaceous earth, zeolites, cellulose, glass wool and/or metal braiding (advantages see above).

As already set forth above, the present invention furthermore relates to a cleaning system for cleaning the process gas in soldering, installations and solder suction systems, in particular for reducing the abietic acid in the process gas, comprising a cleaning chamber for conducting through the process gas to be cleaned, which contains at least one compound (cleaning compound) selected from the group consisting of:

a) carboxylic acids with reducing properties, namely oxalic acid, formic acid, citric acid and/or ascorbic acid;

b) metal compounds of higher oxidation states, namely manganates, permanganates, chromates and/or dichromates;

c) alcohols which can be converted into the carboxylic acids mentioned in a) by means of oxidation;

d) basic lime compounds.

The advantages of the system according to the invention are described above in the context of the method according to the invention. Preferably, the cleaning chamber contains oxalic acid and/or permanganate, in particular potassium permanganate and/or calcium hydroxide (advantages see above).

Advantageously, the cleaning chamber contains filter material, in particular aluminum oxide (e.g. $Al_2O_3$), silica gel, diatomaceous earth, zeolites, cellulose, glass wool and/or metal braiding, which filter material is mixed and/or coated and/or impregnated with one or more of the cleaning compounds (advantages see above).

Further features of the invention result from the following description of a specific embodiment of the invention in connection with the drawing and the dependent claims. Here, the individual features can respectively be realized alone or in combination with one another.

BRIEF DESCRIPTION OF THE DRAWINGS

In the drawing:

FIG. 1 shows a schematic representation of a portion of a soldering installation (willow soldering installation) baying a cleaning system according to the invention.

DETAILED DESCRIPTION OF THE INVENTION

FIG. 1 shows a detail of a soldering installation 1 having a cleaning system according to the invention, comprising a cleaning chamber 4. The cleaning chamber 4 contains filter material in the form of $Al_2O_3$ granulate 3, which is mixed with oxalic acid 3a.

For cleaning the process gas, the same is initially introduced into a conductor 2, from where the process gas to be cleaned (see arrow) is conducted into the cleaning chamber 4. After leaving the cleaning chamber 4, the process gas is fed to a heat exchanger 6 via a discharge 5.

From the heat exchanger 6, the cleaned process gas is fed back to the soldering installation. In the present example, the process gas increasingly includes abietic acid from the colophony, i.e. the flux. After leaving the cleaning chamber, the process gas is almost free of abietic acid. Above all, this has to be attributed to the fact that the oxalic acid has split the abietic acid, (in particular, the methyl groups from the abietic acid have been split off.) The resulting products with lower molecular weights do not condense at the inner walls etc. of the soldering installation, but rather remain in the process gas and can be extracted from the same at some other point (e.g. by means of special filters).

Table shows the compositions of different fluxes winch can occur in the process gas. With each of the fluxes mentioned, optimal cleaning of the process gas was possible, such that hardly any precipitations could be identified at the inner walls of the soldering installations.

TABLE 1

| Flux: | Example 1 |
|---|---|
| Composition: | |
| Resin | 45-55% |
| Activators | 8-15% |

TABLE 1-continued

| Ingredients | CAS No | EC No | Weight % |
|---|---|---|---|
| Solvents | | | 30-40% |
| Rest | | | 2-10% |
| alpha-terpineol | 98-55-5 | 202-680-6 | 15 to 20 |
| Dicarboxylic acid | 124-04-9 | 204-673-3 | 5 to 10 |
| Thermoplastic resins | 8050-09-7 | 232-475-7 | 15 to 20 |

Example 2

| Flux: Ingredients | CAS No | % |
|---|---|---|
| Castor oil | 8001-79-4 | n/s |
| Colophony | 8050-09-7 | 40 to 70 |
| Malonic acid | 141-82-2 | 3 to 7 |
| 2-ethylhexane-1,3-diol | 94-96-2 | 15 to 40 |
| Polyoxyethylene(15)docosyne | 61791-14-8 | 5 to 10 |
| Polyethylene glycol monobutyl ether | 9004-77-8 | n/s |

Example 3

| Flux: Ingredients | CAS No | % |
|---|---|---|
| Carboxylic acids | 68603-87-2 | 5 to 10 |
| 2-ethylimidazole | 1072-62-4 | 5 to 10 |
| Succinic acid | 110-15-6 | 1 to 5 |

Solvents:

the solvents used are, on the one hand, multi-branched glycol ethers having high boiling points (>260). On the other hand, alcohols having multiple hydroxy groups are used.(these solvents burn without residues and in a colorless manner)

Resins:

modified, color-stable natural resins are used. Partly hydrogenated, partly chemically modified in some other way.(as with all resins, after having been burnt, residues remain)

Additives:

micronized waxes, organic natural oil derivatives, multi-branched organic acids

I claim herein:

1. A method for cleaning the process gas in soldering installations or solder suction systems by reducing abietic acid in the process gas comprising:
   conducting the process gas to be cleaned through a cleaning system comprising a cleaning chamber which contains one or more cleaning compounds selected from the group consisting of:
   a) carboxylic acids selected from oxalic acid, formic acid, citric acid, ascorbic acid, or combinations thereof;
   b) metal compounds of higher oxidation states selected from manganates, permanganates, chromates, dichromates, or combinations thereof;
   c) alcohols which can be converted into oxalic acid, formic acid, citric acid, and/or ascorbic acid by means of oxidation;
   d) basic lime compounds; and
   e) combinations thereof,
   wherein said abietic acid chemically reacts with said one or more cleaning compounds thereby reducing the abietic acid in said process gas.

2. The method according to claim 1, wherein the cleaning system comprises oxalic acid and a permanganate, calcium hydroxide, or combinations thereof.

3. The method according to claim 2, wherein the cleaning system comprises potassium permanganate.

4. The method according to claim 1, wherein the cleaning system comprises a filter material mixed with the one or more cleaning compounds.

5. The method according to claim 4, wherein the one or more cleaning compounds are mixed with the filter material by coating, impregnation, or combinations thereof whereby the filter material increases the reaction surface of the cleaning chamber compared to a cleaning system without the filter material.

6. The method according to claim 5, wherein the filter material is selected from the group consisting of aluminum oxide, silica gel, diatomaceous earth, zeolites, cellulose, glass wool, metal braiding, and combinations thereof.

7. The method according to claim 6, wherein the cleaning system further comprises potassium permanganate, calcium hydroxide, or combinations thereof.

8. The method according to claim 1, wherein cleaning of the process gas takes place inside or outside of a process zone at a temperature below 500° C.

9. The method according to claim 8, wherein the cleaning of the process gas is carried out at a temperature of 350° C.

10. A method of reducing condensed depositions of volatile flux elements on soldering installation or solder suction system surfaces by reducing abietic acid in the process gas comprising:
    introducing a process gas from the soldering installation or solder suction system comprising the volatile flux elements into a conductor, wherein the process gas comprises the volatile flux elements;
    conducting the gas from the conductor into a cleaning chamber;
    optionally conducting the gas from the cleaning chamber into a heat exchanger via a discharge; and optionally
    feeding the cleaned process gas from the heat exchanger back to the soldering installation or solder suction system,
    wherein the cleaning chamber comprises at least one cleaning compound selected from the group consisting of:
    a) carboxylic acids selected from oxalic acid, formic acid, citric acid, ascorbic acid, or
    b) combinations thereof;
    c) metal compounds of higher oxidation states selected from manganates, permanganates, chromates, dichromates, or combinations thereof;
    d) alcohols which can be converted into oxalic acid, formic acid, citric acid, and/or ascorbic acid by means of oxidation;
    e) basic lime compounds, and
    f) combinations thereof,
    wherein said abietic acid chemically reacts with said at least one cleaning compound thereby reducing the abietic acid in said process gas.

11. The method according to claim 10, wherein the volatile flux elements are generated from flux comprising colophony.

12. The method according to claim 10, wherein the at least one cleaning compound is selected from oxalic acid, potassium permanganate, calcium hydroxide, or combinations thereof.

13. The method according to claim 10, wherein the cleaning system comprises filter material mixed with the at least one cleaning compound.

14. The method according to claim 13, wherein the filter material is selected from the group consisting of aluminum oxide, silica gel, diatomaceous earth, zeolites, cellulose, glass wool, metal braiding, and combinations thereof.

15. The method according to claim 14, wherein the at least one cleaning compound is mixed with the filter material by coating, impregnation, or a combination thereof, whereby the filter material increases the reaction surface of the cleaning chamber compared to a cleaning system without the filter material.

* * * * *